Jan. 12, 1932.   H. A. JOHNSTON   1,840,779
TRACTION MEANS FOR VEHICLE WHEELS
Filed June 20, 1928   2 Sheets-Sheet 1
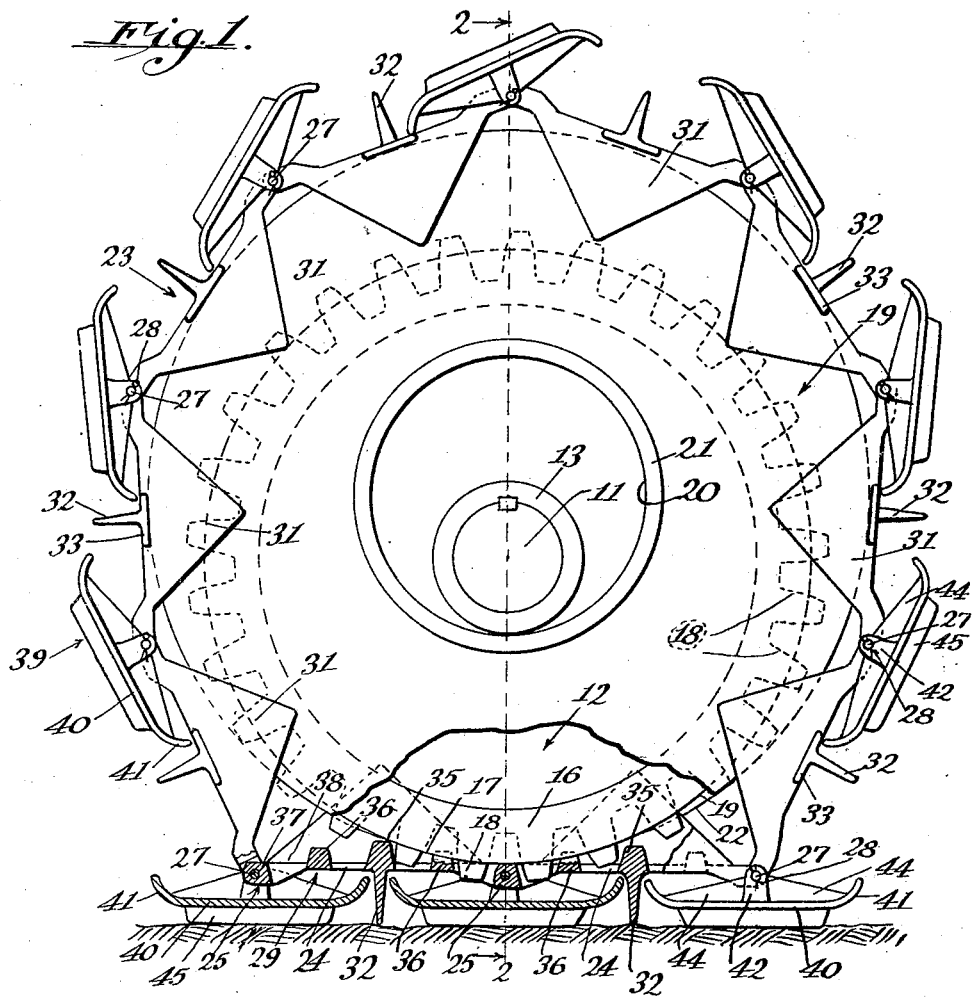
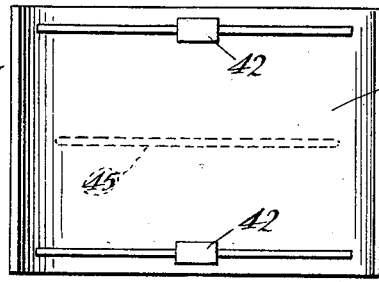
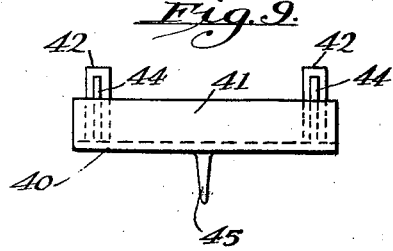
Inventor
Harry A. Johnston
by Hazard and Miller
Attorneys Jan. 12, 1932.  H. A. JOHNSTON  1,840,779
TRACTION MEANS FOR VEHICLE WHEELS
Filed June 20, 1928   2 Sheets-Sheet 2
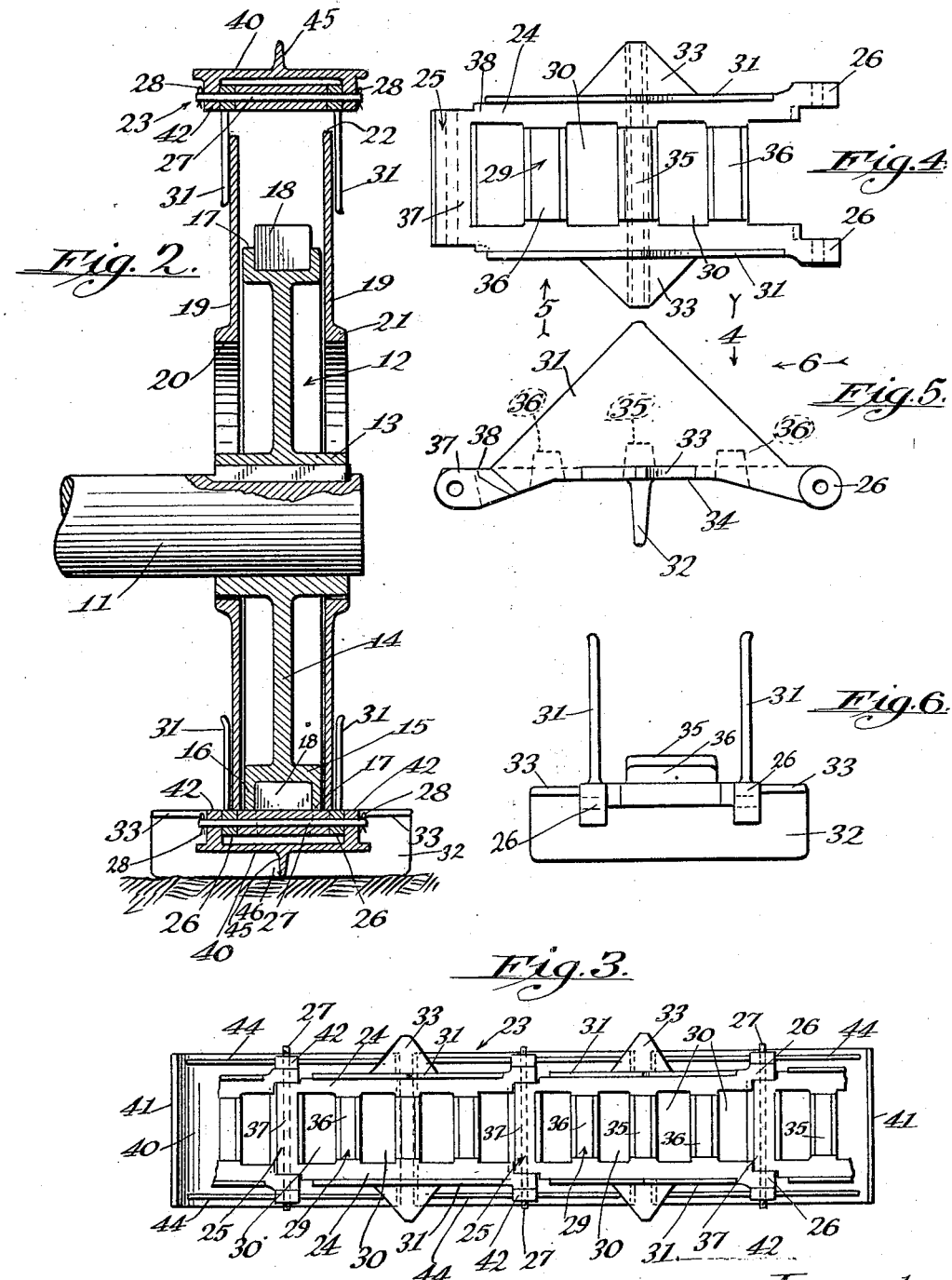
Inventor:
Harry A. Johnston.
by Hazard and Miller
Attorneys Patented Jan. 12, 1932

1,840,779

UNITED STATES PATENT OFFICE

HARRY A. JOHNSTON, OF REDLANDS, CALIFORNIA, ASSIGNOR TO JOHNSTON TRACTORS COMPANY, LTD., OF LOS ANGELES, CALIFORNIA, A CORPORATION OF CALIFORNIA

TRACTION MEANS FOR VEHICLE WHEELS

Application filed June 20, 1928. Serial No. 286,839.

My invention is a traction means for vehicle wheels of the type having an endless track, this invention being an improvement on my patent for traction means for vehicle wheels, No. 1,127,362, dated February 2, 1915.

An object of my present invention is the use in an endless track construction for single vehicle wheels of a jointed chain-like track with rack teeth having open spaces therebetween which engage a gear on the periphery of the wheel. The chain-like track is conveyed and guided by loosely mounted rotatable rings held in place by flanges extending radially inwardly from the links of the chain.

Another object of my invention is the arrangement whereby the rings have large central openings to accommodate the eccentric movement of the rings relative to the hub of the gear wheel, the rings being materially larger in diameter than the wheel.

Another object of my invention is mounting the gear wheel on a fixed axle so that the support of the vehicle is directly carried by this axle and the gear wheel through the medium of the endless chain track, such track having pivotally mounted shoes to engage the ground and form an extended bearing surface. And in this connection a detailed improvement is the construction by which substantially three shoes are in engagement with the ground at the same time forming a broad supporting surface; and between the shoes there are projecting grousers connected to the endless chain track engaging the ground and giving increased traction or effectively preventing slippage.

Another object of my invention is a detailed improvement in the form of teeth used on the endless chain type of rack and the supporting of the wheel on running surfaces of the endless chain so that no pressure other than the driving force is brought to bear on the teeth.

The teeth of the rack are graduated in size from a large tooth at the center of each link to a small tooth at the end or pivotal connection of adjacent links; and between these links there are openings to allow the teeth of the supporting wheel to extend therethrough. The carrying of the weight is through the medium of track-like surfaces on the individual links on which peripheral surfaces on the supporting wheel run, thus giving a smooth and even support at the ends of the teeth.

Another feature of my invention is in the centering of the rings on the wheel by means of the hub engaging the openings in the rings.

Another feature relates to the shoes scraping the mud from the grousers on the chain.

My invention will be more readily understood from the following description and drawings, in which:

Fig. 1 is a side elevation of a traction means constructed in accordance with my invention, partly broken away, Fig. 2 is a vertical section on the line 2—2 of Fig. 1, Fig. 3 is a plan view of the portion of the endless chain and shoes in engagement with the ground as illustrated in Fig. 1, the wheels and rings being removed, Fig. 4 is a plan of one of the links of the endless chain taken in the direction of the arrow 4 of Fig. 5, Fig. 5 is a side elevation of such link taken in the direction of the arrow 5 of Fig. 4, Fig. 6 is an end elevation of the same link taken in the direction of the arrow 6 of Fig. 5, Fig. 7 is a plan of one of the shoes taken in the direction of the arrow 7 of Fig. 8, Fig. 8 is a side elevation of a shoe taken in the direction of the arrow 8 of Fig. 7, Fig. 9 is an end elevation of a shoe taken in the direction of the arrow 9 of Fig. 8.

The main supporting structure comprises the axle 11 having a wheel designated generally by the numeral 12 mounted thereon. This wheel has a hub 13 keyed or otherwise secured to the axle. Extending outwardly from the hub there is a webb 14 which at the outer portion has a peripheral channel-like structure 15 with flanges 16. The peripheral portions 17 of these flanges form bearing surfaces. Between the flanges are the shrouded gear teeth 18. The various features of the wheel are preferably formed integral and the teeth may be of any suitable shape, but these will be noted extend to a considerable depth radially inwardly from the peripheral bearing surfaces 17. (Note particularly Figs. 1 and 2.)

On each side of the wheel is a ring 19 having a large internal opening 20 with an internal rim 21 adjacent thereto and having an outer peripheral surface 22. The large opening is to accommodate the eccentric movement of the rings relative to the hub 13 and the axle 11, and the peripheral surface 22 is adapted to bear on a track surface of the endless chain as hereunder set forth. (Note particularly Figs. 1 and 2.)

The endless chain is designated generally by the numeral 23, the general construction being shown in Figs. 1 and 2 and the particular details in Figs. 3 through 6. Each link of the chain is constructed with side rail sections 24 connected at one end by a knuckle structure 25 and having at the other end a pair of ears 26.

The knuckle structure and the ears have perforations therethrough through which pass the chain pins 27, these being illustrated as secured by cotter pins 28.

Connecting the side rails are the teeth 29 with openings 30 therebetween. Outside the side rails are inwardly extending flanges 31, which it will be noted are substantially triangular shaped in side elevation, the base portion of the triangle terminating inside of the chain pins 27. Extending below the center tooth is a transverse grouser 32 and extending outwardly from the side rails outside of the flanges 31 is a lateral projection 33. This projection in plan view is somewhat triangular shaped as shown in Fig. 4.

It will be noted that there is a cut away portion 34 on the under side of earth of the links as viewed in side elevation, particularly illustrated in Figs. 1 and 5. This lightens the construction of the individual chain links. It will be noted that the center tooth 35 is longer than the two teeth 36 adjacent thereto, and that there is a rudimentary tooth section 37 formed, utilizing the structure of the hub 25. However, this rudimentary tooth has its upper end at substantially the level of the top surface 38 of the side rails.

The shoes designated generally by the numeral 39 are illustrated particularly in Figs. 1, 2, 3, 7, 8 and 9. Each shoe is provided with a tread or plate portion 40 curled up at opposite ends as indicated at 41 and having lugs 42 on opposite sides. These lugs have perforations 43 through which extend the pins 27, thus linking the shoes to the pivoting point of the links of the chain. The shoes have fins 44 on the upper surface extending from the lugs to the curled up ends 41.

Below the under surface of the shoes there are longitudinal grouser teeth 45. The lower surface of these grouser teeth are designed to extend the same distance from the top rail surface 38 of the side rails 24 as the lowermost edge of the grouser teeth 32 of the chain links.

The manner of operation and functioning of my traction means is substantially as follows: It is to be understood that the axle 11 may be driven or may be a dead axle. In the former case the traction device may be used for hauling a load, or in the latter case may be given increased support on the ground for the load to be transported. The weight of the vehicle is supported on the wheel 12, the peripheral edges 17 of which ride on the track surfaces 38 of the side rails 24. The shrouded teeth 18 engage the teeth of the links of the endless chain which links in effect form a rack through the medium of the shoes which are adjacent the ground. In rotation there are always two or three shoes in engagement with the ground, and when the weight is supported centrally over one shoe there are three shoes on the ground; and when the weight is on the middle of a link there are two shoes on the ground, giving an even distribution of weight.

The peripheral edges 22 of the rings 19 also ride on the track surface 38 of the side rails 24, and thes openings 20 in these rings are of sufficient diameter so that there is always a clearance between the lowermost part of the hub 13 and the rims 21 of the rings adjacent thereto, this being illustrated in Fig. 2. The rings are held in place by the triangular flanges 31 extending inwardly from the links of the endless chain.

In the movement of the vehicle either through the driving axle 11 or by otherwise moving the vehicle, the shoes are brought into engagement with the ground, the links of the chain connecting the shoes which engage the ground being straightened out into a more or less straight rack formation so that the shrouded teeth on the wheel engage the teeth of the links, the teeth of the wheel passing through the openings 30 of the links. The chain has a somewhat loose fit on the rings 19 (but for the major portion of their movement when not in contact with the ground the track surface 38 of the side rails of the links is in contact with the peripheral rings 22 of the discs, as illustrated in Fig. 1. It will be seen on account of the engagement of the large grousers 32 of the chain links with the ground and also of the grousers 45 of the shoes that I obtain a good traction on soft soil; and moreover the grousers 32 of the links substantially filling the space between adjacent shoes give an increased bearing surface in contact with the ground over the usual practice.

Other improvements of operation may be manifest to those skilled in the art.

An important feature of my invention is the manner in which the rings maintain the chain and hence the shoes at the proper distance from the hub. There is a slight clearance between the periphery of the hub 13 and the inner surface 20 of the opening in the rings so that in the correct position of running there is no contact between the hub and this surface. However, if the rings tend to roll too far forward or backwardly, then the surface 20 will contact with the hub preventing an excess motion in this regard. The chain is prevented from coming in contact with the gear wheel except at the bottom and there is no danger of the teeth of the gear and the chain accidentally intermeshing on any part of the rotation above the bottom portion of the wheel.

Another characteristic of my invention is that the gear wheel runs on the pitch line of the teeth and the track on the chain is on the pitch line of the teeth of the chain.

Another feature of my invention is that the grousers 32 are kept clear of clinging mud as in the rotation of the chain when these grousers are elevated from the ground they substantially scrape against the curled up ends 41 of the plate of the shoes.

A further feature of my invention is that the rings which form a guiding means for the endless chain track are practically always substantially centered on the normal to the ground surface so that on a horizontal surface the center line of the rings is practically in the same plane as the center line of the axle, and on a grade with the line through the center of the axle and the center of the rings is normal to the grade.

A function performed by the shoes and the grousers is that the shoes tend to keep the grousers 32 clear of accumulation of dirt. Referring to Fig. 1, it will be noted that the ends of the shoes are in close proximity to the grousers and, hence, in the tilting action of the shoes in leaving the ground these have a scraping action, removing the dirt from the grousers and thus maintaining the grousers in a clean condition.

Various changes may be made in the principles of my invention without departing from the spirit thereof, as set forth in the description, drawings and claims.

I claim:

1. A traction means comprising in combination an axle, a supporting wheel mounted thereon having shrouded teeth with peripheral bearing surfaces, an endless track formed of pivotally connected links, each link having side rails connected by transverse teeth, the peripheral bearing surfaces of the wheel running on the said rails, a pair of rings each having a peripheral edge running on the said rails and forming a guide for the portion of the links disengaged from the ground, out of contact with the wheel, the rings having openings of such size as to space the lowest portion of the openings from the lowest portion of the axle.

2. A traction means comprising in combination a rotatable wheel, an endless track formed of pivotally connected chain links, the peripheral portion of the wheel running on the inner surface of the links, a ring adjacent the wheel running on the inside of the links and forming a guide for the portion of the links disengaged from the ground out of contact with the wheel, shoes pivotally connected to the links at their pivotal connections to each other, and a ground engaging structure connected to each link and extending outwardly between two adjacent shoes.

3. A traction means as claimed in claim 2, the shoes having grousers to dig into the ground, the engaging structure being in the form of a transverse grouser.

4. A traction means comprising in combination a supporting wheel, a flexible, chain-like, endless track encircling said wheel and having means to engage the ground, the wheel running on the said track and a guide structure extending beyond the periphery of the wheel and rotating eccentrically thereto and rotatable with the track and running on the track to guide the portion of the track disengaged from the ground, out of contact with the wheel.

5. A traction means comprising in combination a supporting wheel running on the inner side of an endless, chain-like, flexible track encircling said wheel, the track having means to engage the ground, a plurality of rings extending beyond the periphery of the wheel and rotating eccentrically thereto and on opposite faces of the wheel adapted to run on the inner surface of the track, the periphery of the rings forming a guide surface for the portion of the track disengaged from the ground and guiding such portion of the track out of contact with the wheel.

6. A traction means comprising in combination an axle having a supporting wheel mounted thereon, said wheel running on the inner surface of a flexible, chain-like, endless track encircling said wheel, the track having means to engage the ground, a pair of rings extending beyond the periphery of the wheel and rotating eccentrically thereto and on opposite faces of the wheel running on the inner surface of the track, the periphery of the rings guiding the portion of the track disengaged from the ground, out of contact with the wheel, and means on the track to retain the rings in position.

7. A traction means comprising in combination a rotatable wheel, an endless chain track having side rails encircling the wheel, the track having means to engage the ground, the wheel having a peripheral portion running on the said rails with interengaging means between the rails and the wheel to form a drive, and a supporting structure extending beyond the periphery of the wheel and rotating eccentrically thereto adjacent the wheel and associated therewith running on the said side rails, the supporting means forming a guide for the portion of the track disengaged from the ground and guiding said portion of the track out of contact with the wheel, the said supporting means rotating with the track.

8. A traction means comprising in combination a rotatable supporting wheel having a peripheral surface to run on side rails of an endless chain track encircling the wheel, teeth on the wheel engaging with teeth on the links of the chain, guide rings extending beyond the periphery of the wheel and rotating eccentrically thereto and positioned adjacent the wheel having their peripheral edges running on the side rails, the said rings forming a guide for the portion of the links of the chain disengaged from the ground, out of contact with the wheel.

9. A traction means as claimed in claim 8, the links having inwardly extending flanges engaging the said rings on the outside and retaining said rings in position.

10. A traction means as claimed in claim 8, the links of the chain having openings between the teeth to allow projection of the teeth on the wheel therein, and the teeth on the links being of different lengths.

11. A traction means comprising in combination a rotatable supporting wheel having shrouded teeth with a peripheral bearing portion, an endless track formed of pivotally connected chain links having side rails, the said peripheral portion of the wheel running on said rails, a pair of rings on opposite faces of the wheel and extending beyond the periphery of such wheel and rotating eccentrically thereto, each having a peripheral edge running on the side rails and forming a guide for the links, and shoes pivotally connected to the links at their pivotal connection.

12. A traction means comprising in combination a rotatable supporting wheel having shrouded teeth with a peripheral bearing portion, an endless track formed of pivotally connected chain links having side rails, the said peripheral portion of the wheel running on said rails, a pair of rings each having a peripheral edge running on the side rails and forming a guide for the links, and shoes pivotally connected to the links at their pivotal connection, the links having inwardly extending flanges engaging the rings and retaining same in position, and each link having an outwardly extending grouser fitting between two adjacent shoes.

13. A traction means comprising a supporting wheel running on the inner side of an encircling, endless, flexible track, the track having means to engage the ground, guide means adjacent a side face of the wheel and extending beyond the periphery of the wheel and rotating eccentrically to the wheel engaging the inner side of the flexible track by a sliding engagement to guide the portion of the track disengaged from the ground, out of contact with the wheel, and means to retain the guiding means in a substantially constant guiding position relative to the wheel.

14. A traction means comprising a supporting wheel running on the inner side of an encircling, endless, flexible track, the track having means to engage the ground, guide means adjacent a side face of the wheel and extending beyond the periphery of the wheel and rotating eccentrically to the wheel engaging the inner side of the flexible track by a sliding engagement to guide the portion of the track disengaged from the ground, out of contact with the wheel, and means to rotate the guiding means in a plane parallel to that of the wheel.

15. In a traction means, an endless track formed of pivotally connected chain links, each link having opposite side rails with a flat bearing surface, teeth connecting said side rails, there being spaces between the teeth, the teeth of each link being of different elevations in regard to the bearing surface of the side rails, the center teeth being materially longer than the teeth at the end of each link, the teeth at the end of each link being formed adjacent the pivot forming the connection to an adjacent link, and a load carrying wheel rolling on said rails and having teeth engaging the teeth of the links, the teeth on the wheel extending into the spaces between the teeth on the links.

16. In a traction means, a load supporting wheel having teeth of approximately the same length, an endless track formed of pivotally connected chain links passing over said wheel, said wheel running on said links, each link having teeth to engage the teeth of the wheel, the tooth at the center of each link being materially longer than the tooth at the pivotal end of the link, and the intermediate teeth being graduated in length, thereby providing a clearance for the teeth on the link in leaving and entering the teeth on the wheel in the rotation of the wheel.

17. In a traction means, a load supporting wheel having shrouded teeth and being provided with a peripheral rolling surface, an endless track formed of pivotally connected chain links, each link having tracks engaged by the periphery of the wheel, a guide means rotating eccentrically with the wheel and forming a guide for the chain links which are disconnected from the ground, each link having teeth, the center tooth of each link being materially longer than the tooth adjacent the pivotal end of the link, and the intermediate teeth being graduated in length between the shortest and the longest thereby giving a clearance as the teeth on the links enter and leave the teeth on the wheel in the rolling motion of the wheel over the chain.

In testimony whereof I have signed my name to this specification.

H. A. JOHNSTON.